United States Patent
Shih et al.

(10) Patent No.: US 8,686,309 B2
(45) Date of Patent: Apr. 1, 2014

(54) TOUCH PANEL HAVING CONDUCTIVE ZONE FOR AVOIDING FALSE OPERATION

(75) Inventors: Po-Sheng Shih, Hsinshu (TW); Chien-Yung Cheng, Hsinchu (TW)

(73) Assignee: Shih Hua Technology Ltd., Zhubei, Hsinchu County (TW)

( * ) Notice: Subject to any disclaimer, the term of this patent is extended or adjusted under 35 U.S.C. 154(b) by 93 days.

(21) Appl. No.: 13/476,126

(22) Filed: May 21, 2012

(65) Prior Publication Data
US 2013/0043116 A1 Feb. 21, 2013

(30) Foreign Application Priority Data
Aug. 17, 2011 (TW) .................................. 100129301

(51) Int. Cl.
*H03K 17/975* (2006.01)
(52) U.S. Cl.
USPC ........................................................ 200/600
(58) Field of Classification Search
USPC ........... 200/600, 310–317, 46, 292, 511–512, 200/514; 345/173–174; 29/846; 174/250
See application file for complete search history.

(56) References Cited

U.S. PATENT DOCUMENTS

| | | | |
|---|---|---|---|
| 2008/0142352 A1* | 6/2008 | Wright | 200/600 |
| 2012/0062509 A1* | 3/2012 | Hsu | 345/174 |
| 2012/0075218 A1* | 3/2012 | Lin et al. | 345/173 |
| 2012/0325639 A1* | 12/2012 | Scuderi et al. | 200/600 |

\* cited by examiner

*Primary Examiner* — Edwin A. Leon
(74) *Attorney, Agent, or Firm* — Altis Law Group, Inc.

(57) ABSTRACT

A touch panel includes an insulating substrate, a transparent conductive layer, a number of electrodes, a number of conductive wires, and at least one conductive zone. The transparent conductive layer corresponding to a touch area of the touch panel is fixed on the insulating substrate. The electrodes are electrically connected to the transparent conductive layer. The conductive wires are electrically connected to a controller and are respectively electrically connected to the electrodes. The at least one conductive zone has two ends. One of the two ends of the at least one conductive zone is electrically connected to the controller. The at least one conductive zone and the conductive wires are disposed in a trace area of the touch panel at a distance.

20 Claims, 18 Drawing Sheets

TOUCH PANEL HAVING CONDUCTIVE ZONE FOR AVOIDING FALSE OPERATION

CROSS-REFERENCE TO RELATED APPLICATIONS

This application claims all benefits accruing under 35 U.S.C. §119 from Taiwan Patent Application No. 100129301, filed on Aug. 17, 2011 in the Taiwan Intellectual Property Office, the disclosure of which is incorporated herein by reference.

BACKGROUND

1. Technical Field

The present disclosure relates to a touch panel having at least one conductive zone.

2. Description of Related Art

Touch sensing technology is capable of providing a natural interface between an electronic system and a user, and has found widespread applications in a variety of fields, such as mobile phones, personal digital assistants, automatic teller machines, game machines, medical devices, liquid crystal display devices, and computing devices.

There are different types of touch panels for detecting a touch spot. One example is a capacitive touch panel.

Capacitive touch panels including transparent conductive films and conductive wires are widely used in various fields due to their high sensitivity. However, the user may touch the conductive wires out of a sensing area rather than the transparent conductive films in the sensing area, which will result in a false operation when detecting a touch spot.

What is needed, therefore, is to provide a touch panel that can overcome the above-described shortcomings.

BRIEF DESCRIPTION OF THE DRAWINGS

Many aspects of the disclosure can be better understood with reference to the drawings. The components in the drawings are not necessarily drawn to scale, the emphasis instead being placed upon clearly illustrating the principles of the present disclosure. Moreover, in the drawings, like reference numerals designate corresponding parts throughout the views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean at least one.

Figure 1:
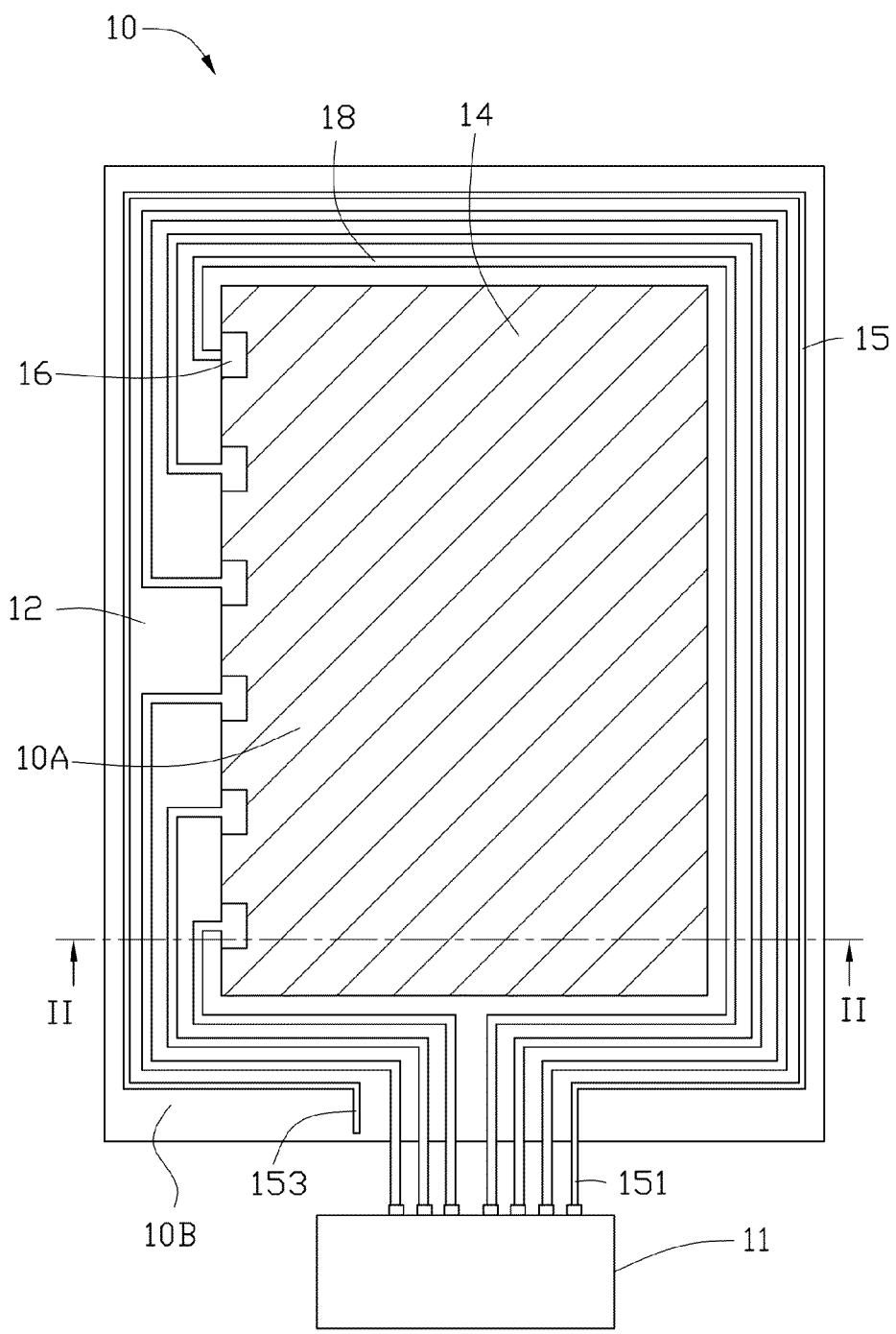
FIG. 1 is a schematic view of one embodiment of a touch panel.
Figure 2:
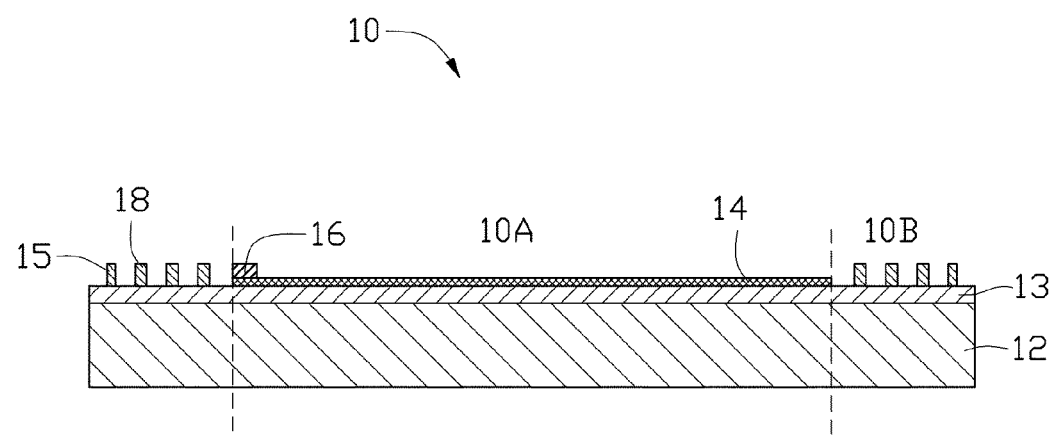
FIG. 2 is a cross-section of the touch panel shown in FIG. 1 taken along a line II-II thereof.

According to one embodiment, a touch panel 10 having a touch area 10A and a trace area 10B as illustrated in FIG. 1 and FIG. 2 includes a controller 11, an insulating substrate 12, a viscose layer 13, a transparent conductive layer 14, a number of electrodes 16, a number of conductive wires 18, and a conductive zone 15.

The touch area 10A is an area for sensing a touch spot of the touch panel 10. The trace area 10B is an area for disposing the conductive wires 18 and the conductive zone 15 rather than sensing the touch spot. In one embodiment, the touch area 10A is a central area of the touch panel 10. The trace area 10B is an area surrounding the touch area 10A. An area of the touch area 10A is less than an area of the touch panel 10.

The viscose layer 13 is disposed on a surface of the insulating substrate 12. The transparent conductive layer 14, the conductive wires 18, and the conductive zone 15 are disposed on a surface of the viscose layer 13. The transparent conductive layer 14 corresponds to the touch area 10A of the touch panel 10. The conductive zone 15 and the conductive wires 18 are disposed in the trace area 10B of the touch panel 10 at a distance. The electrodes 16 are disposed on a surface and at one side of the transparent conductive layer 14. The number of the electrodes 16 is the same as the number of the conductive wires 18. Each of the electrodes 16 is electrically connected to the transparent conductive layer 14. Each of the conductive wires 18 has two ends. One end of each of the conductive wires 18 is electrically connected to a corresponding electrode 16, and the other end of each of the conductive wires 18 is electrically connected to the controller 11. Thus, the transparent conductive layer 14 is electrically connected to the controller 11 via the electrodes 16 and the conductive wires 18. Furthermore, in one embodiment, the transparent conductive layer 14, the conductive wires 18, and the conductive zone 15 can be disposed on the surface of the insulating substrate 12.

The number of the electrodes 16 relates to the area or a touch dots per inch (DPI) of the touch panel 10. More specifically, when the area or the touch DPI of the touch panel 10 is greater, the number of the electrodes 16 is proportionally greater, and vice versa. In one embodiment, there are six electrodes 16 disposed on one side of the transparent conductive layer 14.

The conductive zone 15 extends along a part of each of the conductive wires 18. The conductive zone 15 is also substantially parallel with a part of the conductive wires 18. In one embodiment, the conductive zone 15 extends along each of the conductive wires 18 to pass through the trace area 10B of the touch panel 10. The conductive zone 15 has a first end 151 and a second end 153. The first end 151 of the conductive zone 15 is electrically connected to the controller 11. The second end 153 of the conductive zone 15 is electrically insulated from the controller 11, the transparent conductive layer 14, the electrodes 16, and the conductive wires 18. In one embodiment, the conductive wires 18 surround the transparent conductive layer 14. The conductive zone 15 surrounds the conductive wires 18.

Figure 3A:
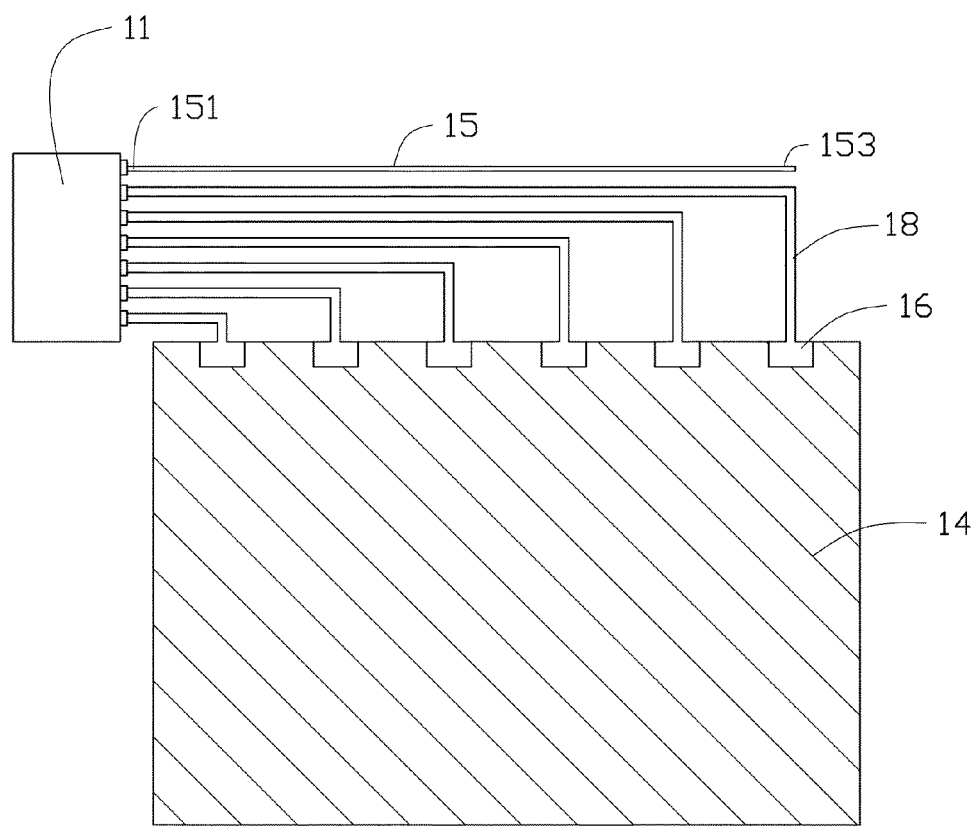
FIG. 3A is a schematic view of one embodiment of an arrangement of conductive wires and a conductive zone of a touch panel.

Referring to FIG. 3A, the conductive wires 18 are disposed at one side of the transparent conductive layer 14. There is one straight conductive zone 15 substantially parallel with a part of each of the conductive wires 18. The straight conductive zone 15 is disposed at one side of the conductive wires 18.

Figure 3B:
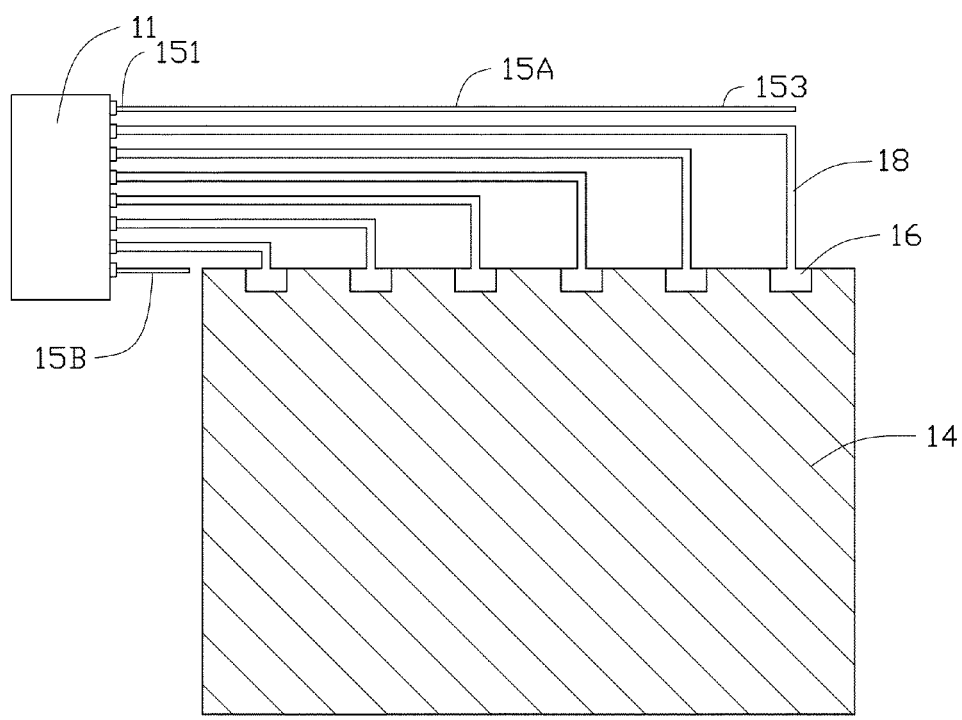
FIG. 3B is a schematic view of one embodiment of an arrangement of conductive wires and conductive zones of a touch panel.

Referring to FIG. 3B, the conductive wires 18 are disposed at one side of the transparent conductive layer 14. There is a first straight conductive zone 15A and a second straight conductive zone 15B with different lengths substantially parallel with a part of the conductive wires 18. The first straight conductive zones 15A and the second straight conductive zones 15B are respectively disposed at two sides of the conductive wires 18. In one embodiment, a width of the first straight conductive zone 15A and a width of the second straight conductive zone 15B are substantially the same.

Figure 3C:
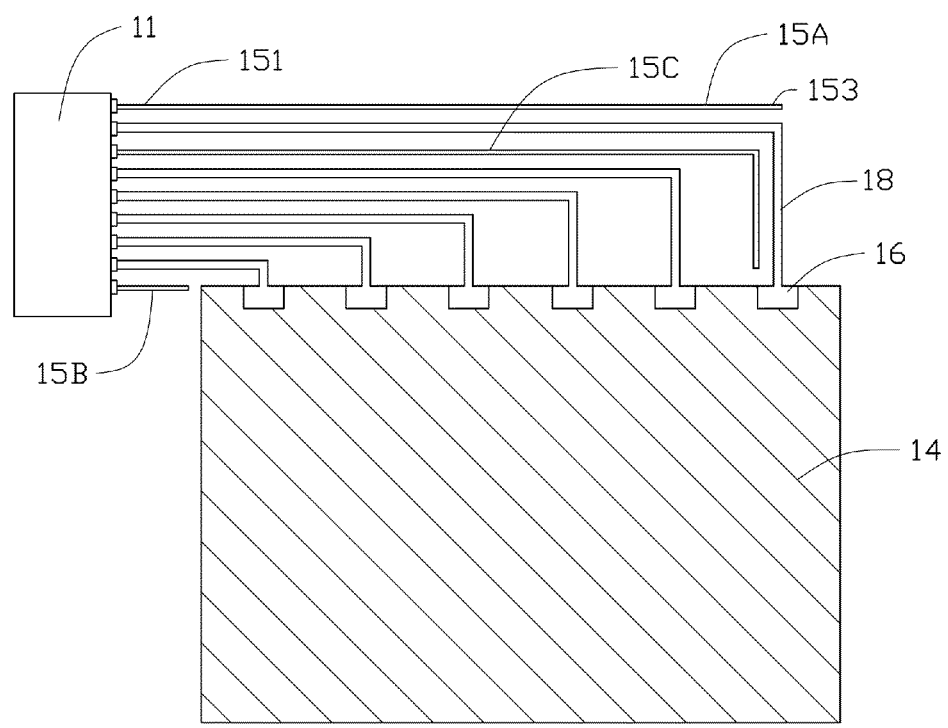
FIG. 3C is a schematic view of one embodiment of an arrangement of conductive wires and conductive zones of a touch panel.

Referring to FIG. 3C, the conductive wires 18 are disposed at one side of the transparent conductive layer 14. There is a first conductive zone 15A, a second conductive zone 15B, and a third conductive zone 15C with different lengths disposed in the trace area 10B of the touch panel 10. The first conductive zones 15A and the second conductive zones 15B are substantially parallel with a part of each of the conductive wires 18 and respectively disposed at two sides of the conductive wires 18. The third conductive zone 15C extends along one of the conductive wires 18 between two of the conductive wires 18. In one embodiment, a width of the first conductive zone 15A, a width of the second conductive zone 15B, and a width of the third conductive zone 15C are substantially the same.

Figure 4:
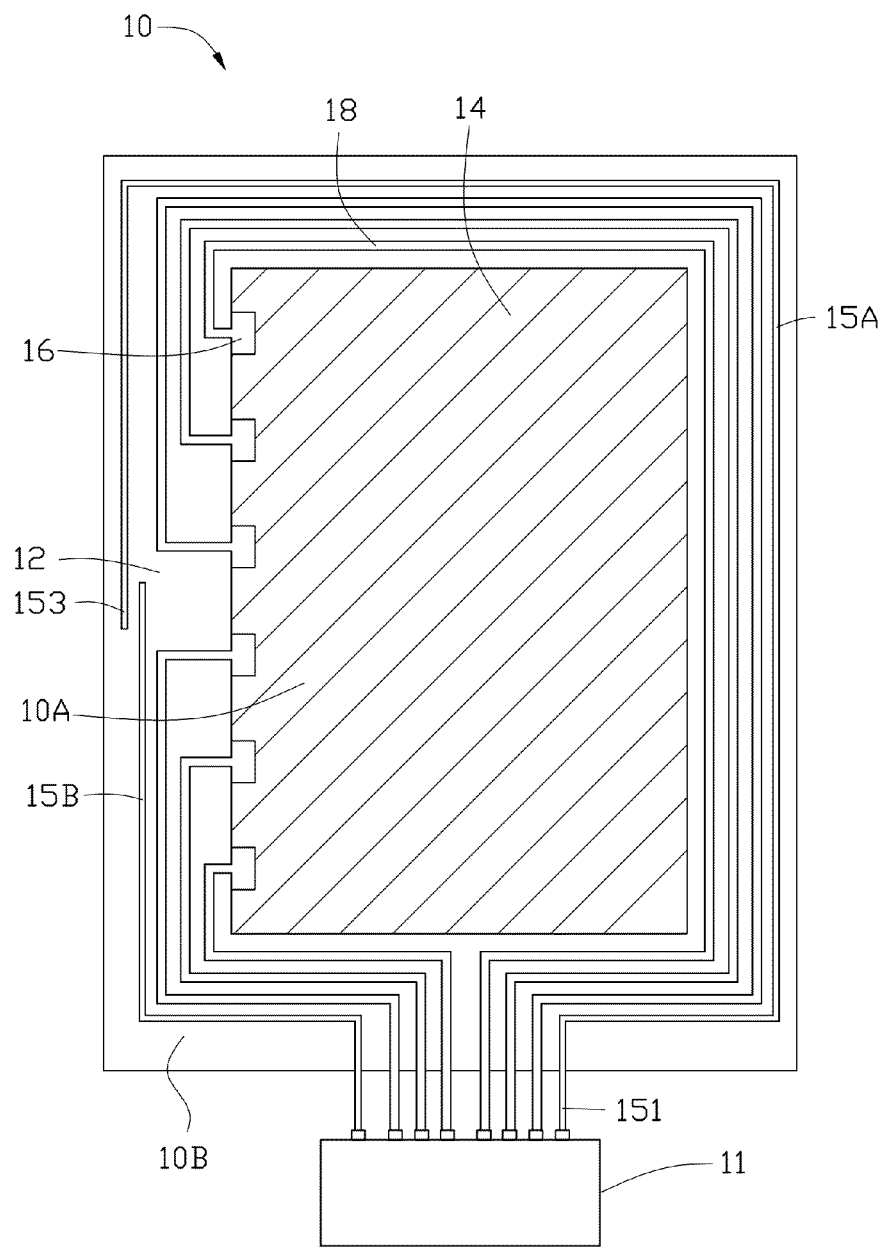
FIG. 4 is a schematic view of one embodiment of a touch panel.

Referring to FIG. 4, in one embodiment, there is a first conductive zone 15A and a second conductive zone 15B with different lengths substantially parallel with a part of each of the conductive wires 18. The first conductive zone 15A surrounds a part of each of the conductive wires 18. Similarly, the second conductive zone 15B surrounds a part of each of the conductive wires 18. A part of the first conductive zone 15A and a part of the second conductive zone 15B are disposed in the trace area 10B of the touch panel 10 at a distance, and substantially parallel with each other. In one embodiment, a width of the first conductive zone 15A and a width of the second conductive zone 15B are substantially the same.

Figure 5:
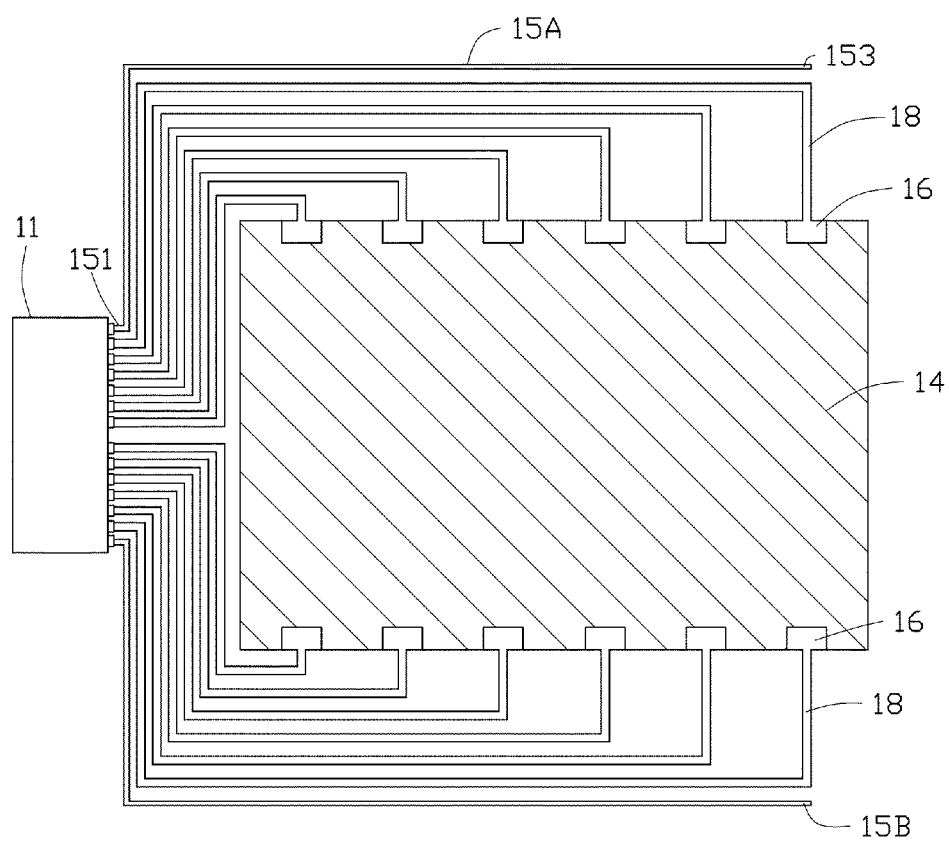
FIG. 5 is a schematic view of one embodiment of an arrangement of conductive wires and conductive zones of a touch panel.

Referring to FIG. 5, the electrodes 16 are disposed at two sides of the transparent conductive layer 14. Similarly, the conductive wires 18 are disposed at two sides of the transparent conductive layer 14. There is a first conductive zone 15A and a second conductive zone 15B substantially parallel with a part of each of the conductive wires 18. More specifically, the first conductive zone 15A extends along a part of the conductive wires 18 and is disposed at one side of the transparent conductive layer 14. The second conductive zone 15B extends along a part of the conductive wires 18 and is disposed at the other side of the transparent conductive layer 14. In one embodiment, a width of the first conductive zone 15A and a width of the second conductive zone 15B are substantially the same.

Figure 6:
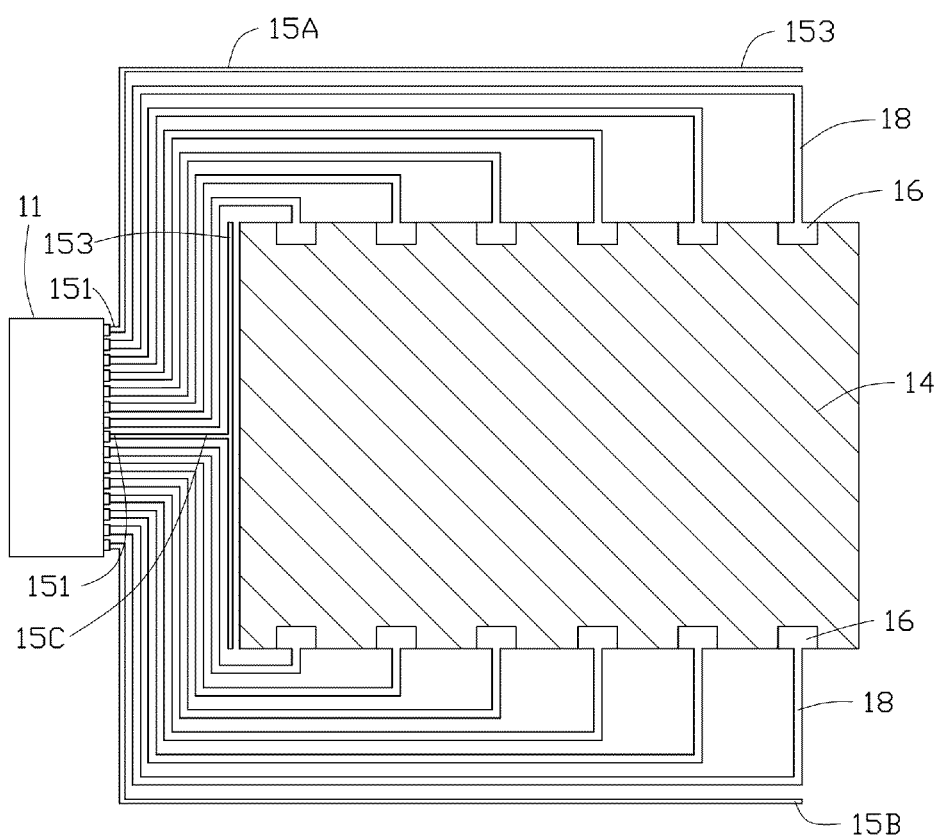
FIG. 6 is a schematic view of one embodiment of an arrangement of conductive wires and conductive zones of a touch panel.

Referring to FIG. 6, in one embodiment, the electrodes 16 are disposed at two sides of the transparent conductive layer 14. Similarly, the conductive wires 18 are disposed at two sides of the transparent conductive layer 14. A first conductive zone 15A, a second conductive zone 15B, and a third conductive zone 15C with different lengths are disposed in the trace area 10B of the touch panel 10. More specifically, the first conductive zone 15A extends along a part of the conductive wires 18 and is disposed at one side of the transparent conductive layer 14. The second conductive zone 15B extends along a part of the conductive wires 18 and is disposed at the other side of the transparent conductive layer 14. The third conductive zone 15C which is a T-shaped conductive zone extends along a part of the conductive wires 18 and is disposed between two of the conductive wires 18. In one embodiment, a width of the first conductive zone 15A, a width of the second conductive zone 15B, and a width of the third conductive zone 15C are substantially the same.

Figure 7:
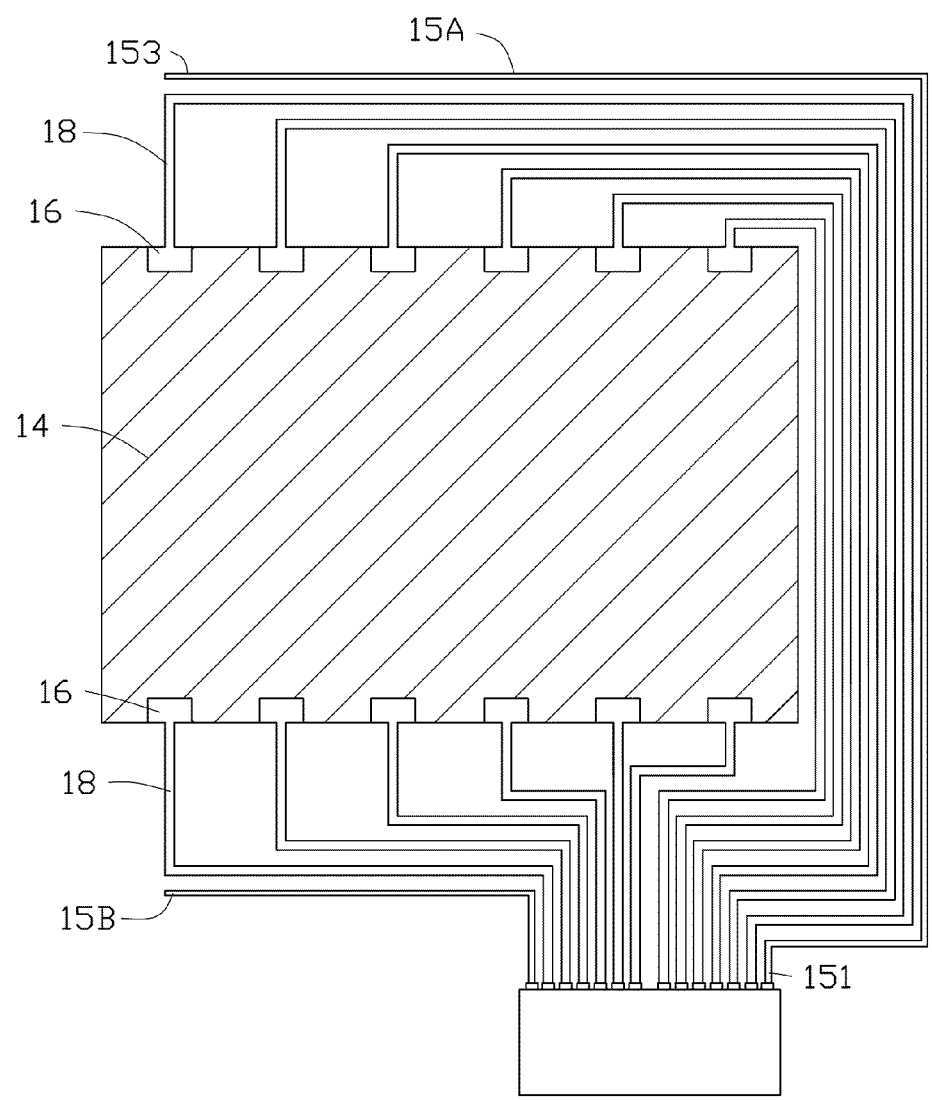
FIG. 7 is a schematic view of one embodiment of an arrangement of conductive wires and conductive zones of a touch panel.
Figure 8:
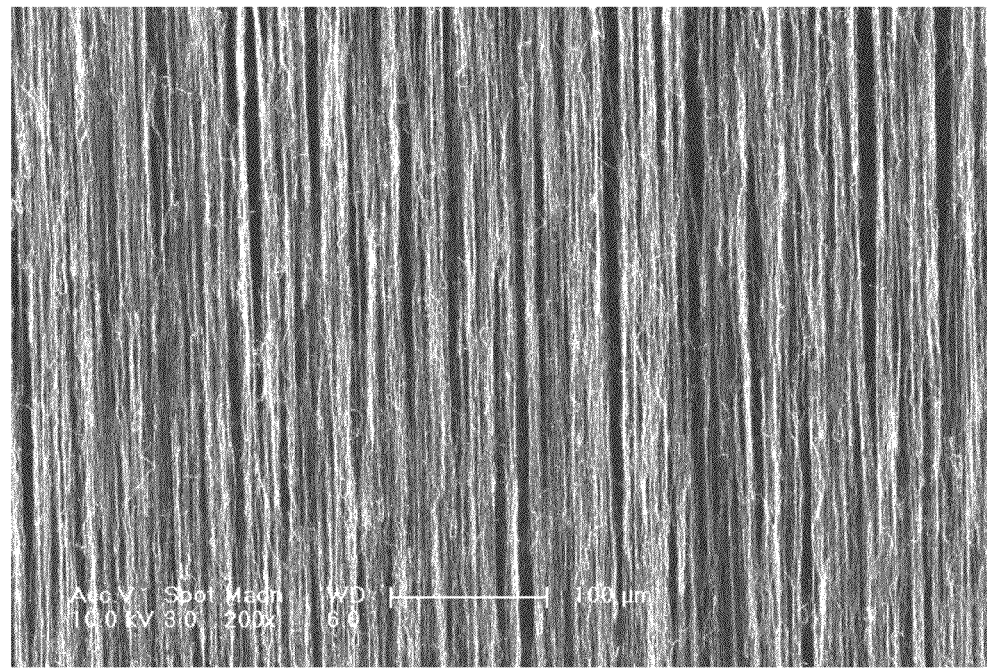
FIG. 8 shows a Scanning Electron Microscope (SEM) image of one embodiment of a carbon nanotube film.

Referring to FIG. 7, in one embodiment, the electrodes 16 are disposed at two sides of the transparent conductive layer 14. The first conductive zone 15A and the second conductive zone 15B are substantially parallel with a part of each of the conductive wires 18. More specifically, the first conductive zone 15A extends along a part of the conductive wires 18. The second conductive zone 15B extends along a part of the conductive wires 18. In one embodiment, a width of the first conductive zone 15A and a width of the second conductive zone 15B are substantially the same.

The insulating substrate 12 having a plane structure or a curved structure can be formed using transparent material, such as polyethylene (PE), polycarbonate (PC), polyethylene terephthalate (PET), polymethyl methacrylate (PMMA), polyimide (PI), polyether sulphone (PES), cellulose resin, polyvinylchloride (PVC), benzocyclobutene (BCB), acrylic resin, glass, or quartz, for example. In one embodiment, the insulating substrate 12 has a plane structure and is formed by polycarbonate.

The transparent conductive layer 14 can be a carbon nanotube layer, an indium tin oxide (ITO) layer, or an antimony tin oxide (ATO) layer. In one embodiment, the transparent conductive layer 14 is a carbon nanotube layer. The carbon nanotube layer has a number of carbon nanotubes that can be arranged substantially parallel to a surface of the carbon nanotube layer. The carbon nanotube layer can have a thickness of about 0.5 nanometers (nm) to about 100 micrometers (um). In one embodiment, the carbon nanotube layer has a thickness of about 100 nm to about 200 nm.

The carbon nanotubes can be single-walled carbon nanotubes, double-walled carbon nanotubes, multi-walled carbon nanotubes, or combinations thereof. The diameter of the single-walled carbon nanotubes can be in the range from about 0.5 nm to about 50 nm. The diameter of the double-walled carbon nanotubes can be in the range from about 1 nm to about 50 nm. The diameter of the multi-walled carbon nanotubes can be in the range from about 1.5 nm to about 50 nm. The length of the carbon nanotubes can be greater than 50 um.

A drawn carbon nanotube film forms the carbon nanotube layer, which can be pulled/drawn from a carbon nanotube array. A large number of the carbon nanotubes in the drawn carbon nanotube film can be oriented along a preferred orientation, meaning that a large number of the carbon nanotubes in the drawn carbon nanotube film are arranged substantially along the same direction. An end of one carbon nanotube is joined to another end of an adjacent carbon nanotube arranged substantially along the same direction, by van der Waals attractive force. More specifically, the drawn carbon nanotube film includes a plurality of successively oriented carbon nanotube segments joined end-to-end by van der Waals attractive force therebetween. Each carbon nanotube segment includes a plurality of carbon nanotubes substantially parallel to each other, and joined by van der Waals attractive force therebetween. The carbon nanotube segments can vary in width, thickness, uniformity, and shape. The drawn carbon nanotube film has minimum impedance along the stretching direction of the successive and oriented carbon nanotubes and maximum impedance along the direction perpendicular to the stretching direction of the successive and oriented carbon nanotubes so as to have anisotropic impedance.

A small number of the carbon nanotubes are randomly arranged in the drawn carbon nanotube film, and has a small if not negligible effect on the larger number of the carbon nanotubes in the drawn carbon nanotube film arranged substantially along the same direction.

The carbon nanotube film is capable of forming a free-standing structure. The term "free-standing structure" can be defined as a structure that does not have to be supported by a substrate. For example, a free-standing structure can sustain the weight of itself when it is hoisted by a portion thereof without any significant damage to its structural integrity. The free-standing structure of the drawn carbon nanotube film is realized by the successive segments joined end to end by van der Waals attractive force.

Understandably, some variation can occur in the orientation of the carbon nanotubes in the drawn carbon nanotube film. Microscopically, the carbon nanotubes oriented substantially along the same direction may not be perfectly aligned in a straight line, and some curve portions may exist. Furthermore, it can be understood that some carbon nanotubes are located substantially side by side and oriented along the same direction and in contact with each other.

The viscose layer 13 can be formed using material with a low fusion point, such as ultraviolet (UV) adhesive, polymethyl methacrylate (PMMA) or polyvinylchloride (PVC). The viscose layer 13 can have a thickness of about 1 nm to about 500 um. In one embodiment, the viscose layer 13 has a thickness of about 1.5 um and is formed by UV adhesive.

The electrodes 16, the conductive wires 18, and the conductive zone 15 can be formed using conductive material, such as conductive thick liquid, metal, indium tin oxide (ITO), or any combination thereof. In one embodiment, the electrodes 16, the conductive wires 18, and the conductive zone 15 are made of conductive thick liquid, which includes powdered metal, powdered glass with a low fusion point, and binder. The powdered metal is powdered silver. The binder is terpineol or ethyl cellulose. A weight percentage of the powdered metal is in a range from about 50% to about 90%. A weight percentage of the powdered glass with the low fusion point is in a range from about 2% to about 10%. A weight percentage of the binder is in a range from about 8% to about 40%. The electrodes 16 are made by printing or plating the conductive thick liquid onto the transparent conductive layer 14. The conductive wires 18 and the conductive zone 15 are made by printing or plating the conductive thick liquid onto the viscose layer 13. In another embodiment, the conductive wires 18 and the conductive zone 15 are made by printing or plating the conductive thick liquid onto the insulating substrate 12.

During use of the touch panel 10, the controller 11 initiates a deduction control when the controller 11 senses touching of the trace area 10B of the touch panel 10 rather than touching of the touch area 10A of the touch panel.

Figure 9A:
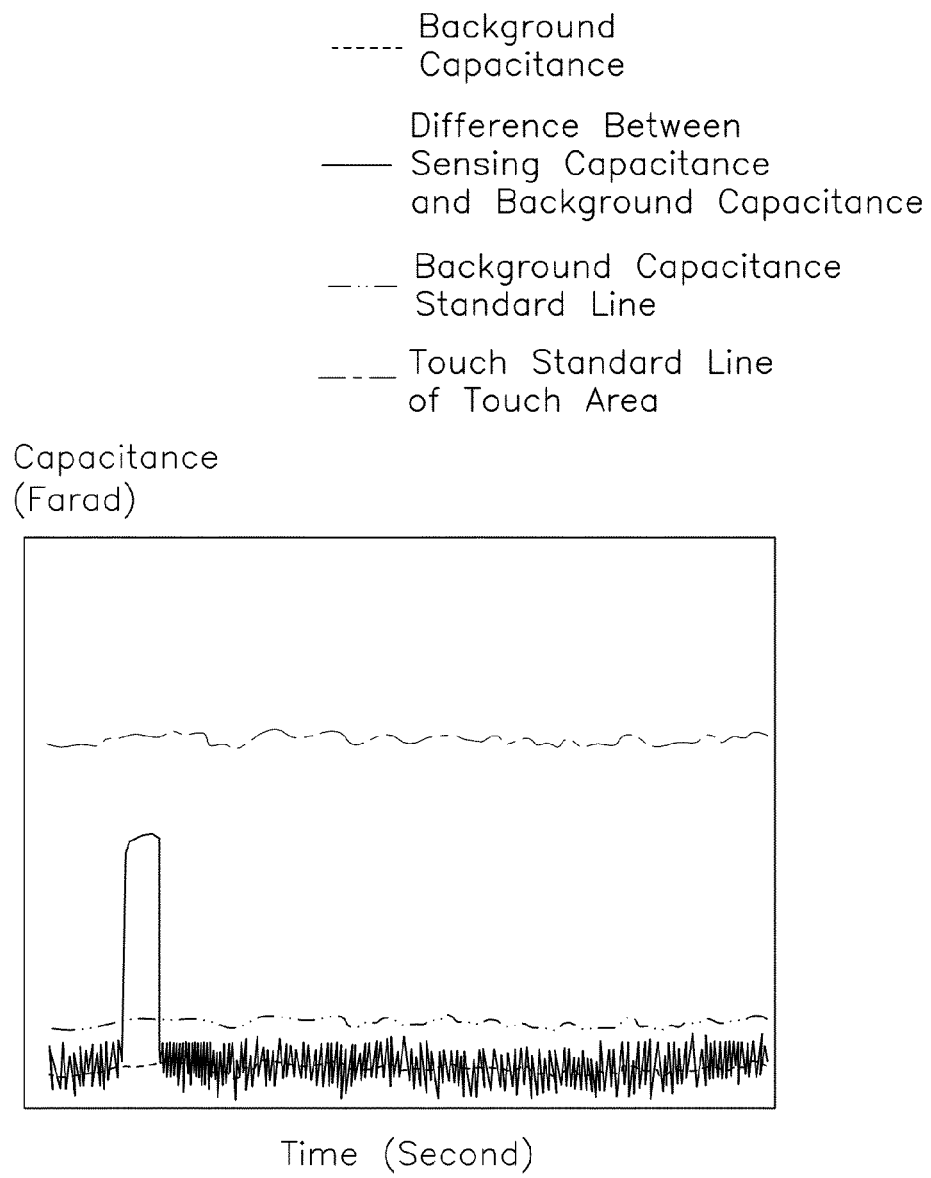
FIG. 9A is a waveform chart of capacitance-time curves of a conductive zone of the touch panel shown in FIG. 1.

Referring to FIG. 9A, which shows capacitance-time curves of the conductive zone 15 of the touch panel 10, a difference between sensing capacitance and background capacitance of the conductive zone 15 is greater than a background capacitance standard line, and smaller than a touch standard line of the touch area 10A of the touch panel 10. Thus, the conductive zone 15 disposed in the trace area 10B of the touch panel 10 is determined to be touched. In other words, the controller 11 senses capacitance at the trace area 10B such that touching of the trace area 10B is produced.

Figure 9B:
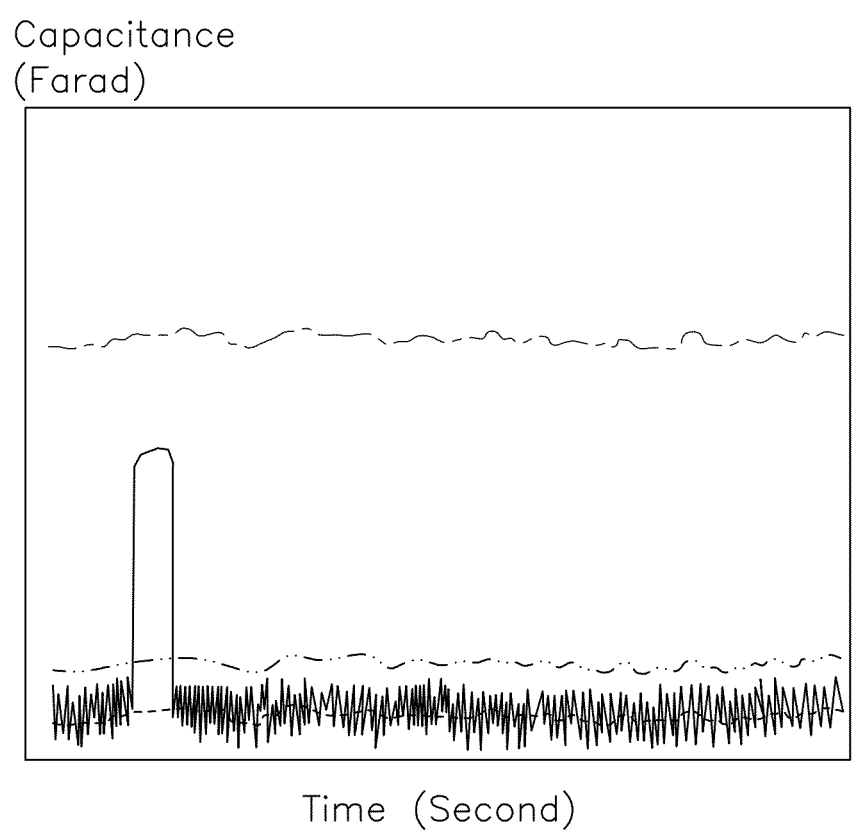
FIG. 9B is a waveform chart of capacitance-time curves of the touch panel shown in FIG. 1.

Referring to FIG. 9B, which shows capacitance-time curves of the touch panel 10, a difference between sensing capacitance and background capacitance of the touch panel 10 is greater than a background capacitance standard line, and smaller than a touch standard line of the touch area 10A of the touch panel 10. Thus, the touch area 10A of the touch panel 10 is determined not to be touched. In other words, the controller 11 senses no touch of the touch area 10A.

Figure 10A:
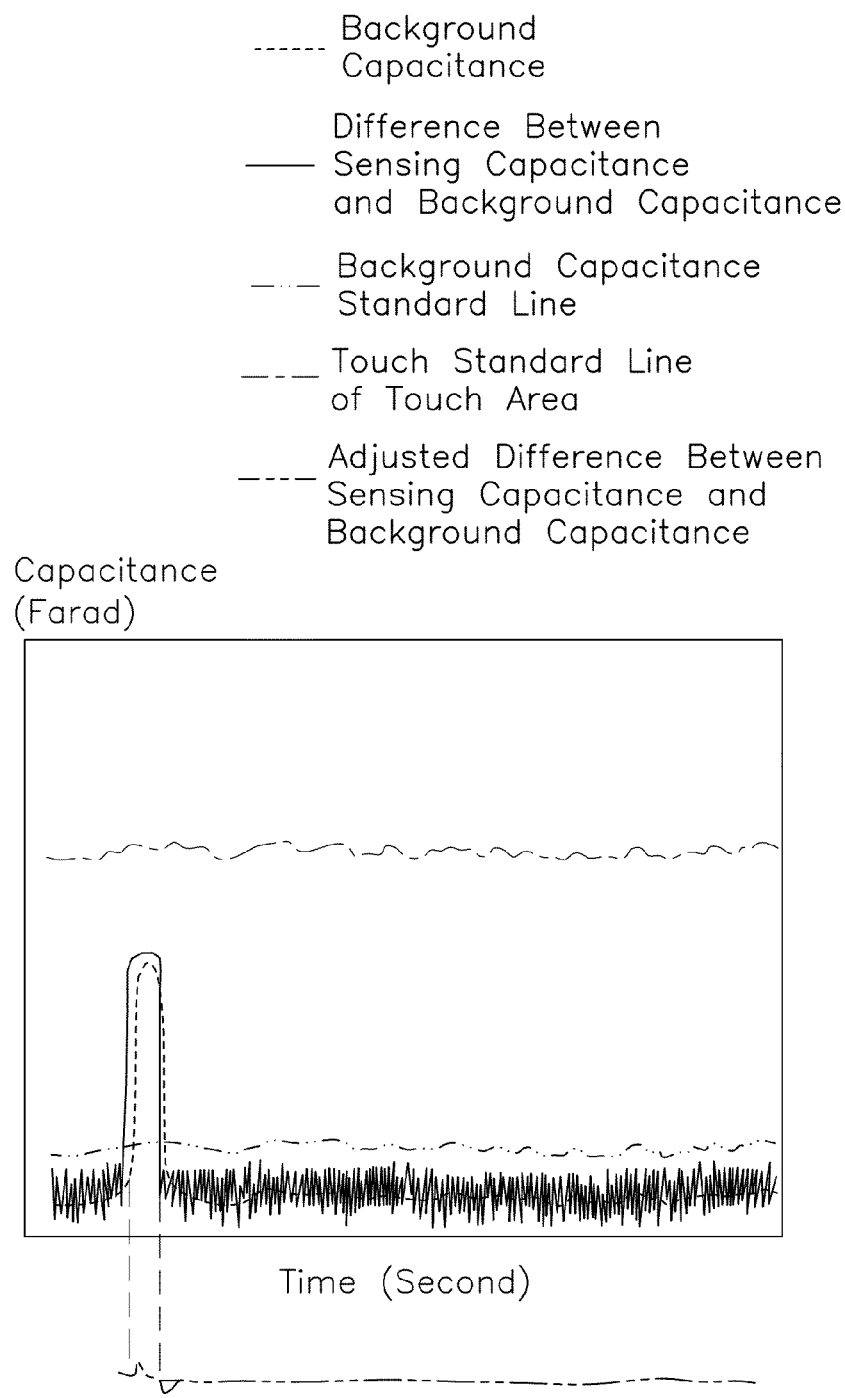
FIG. 10A is a waveform chart of capacitance-time curves of a conductive zone of the touch panel shown in FIG. 1 with deduction control.
Figure 10B:
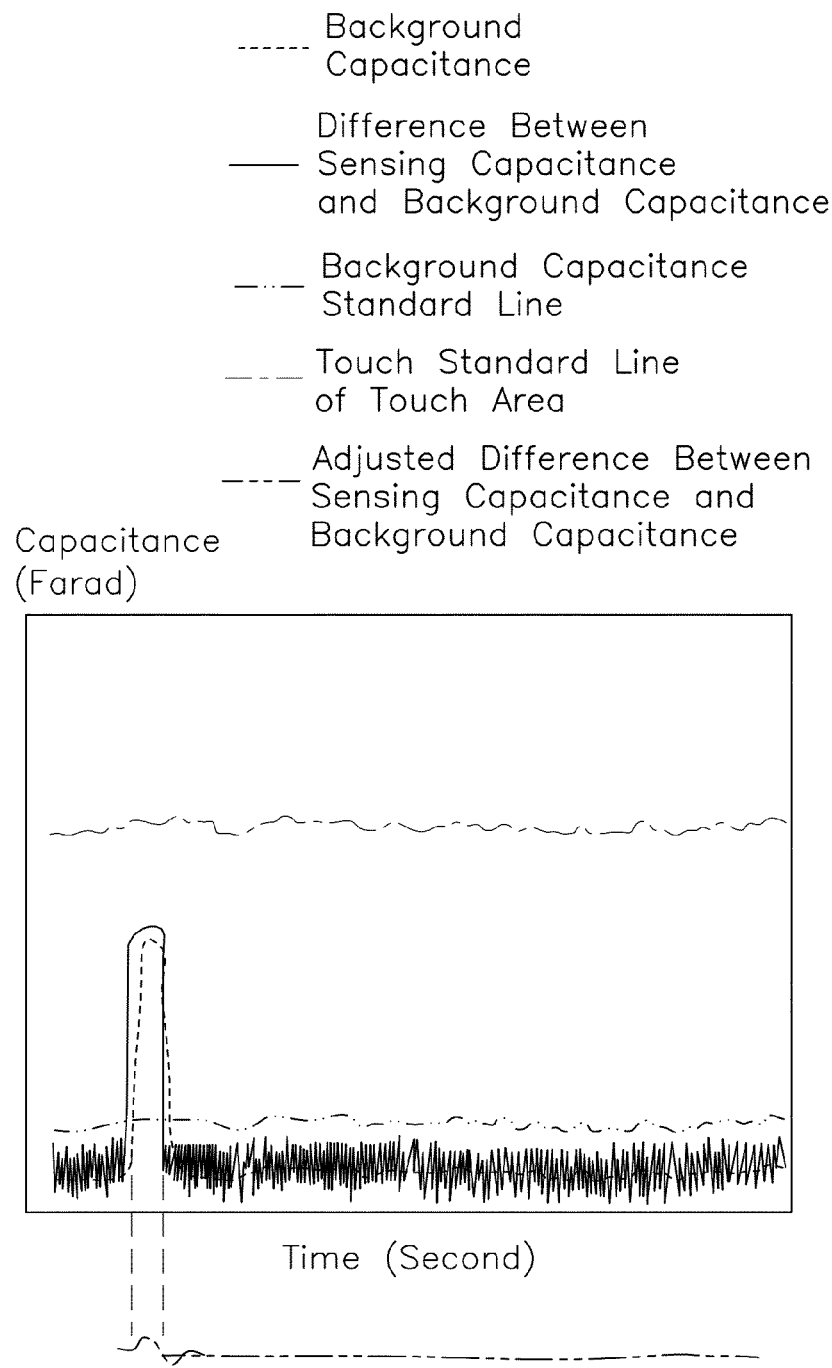
FIG. 10B is a waveform chart of capacitance-time curves of the touch panel shown in FIG. 1 with deduction control.

Referring to FIG. 10A, in response to the difference between sensing capacitance and background capacitance of the conductive zone 15 shown in FIG. 9A, the controller 11 initiates the deduction control for reducing the difference between sensing capacitance and background capacitance of the conductive zone 15 by adjusting background capacitance. The difference between sensing capacitance and background capacitance of the conductive zone 15 will be reduced. In one embodiment, the difference between sensing capacitance and background capacitance of the conductive zone 15 is about zero. Similarly, referring to FIG. 10B, in response to the difference between sensing capacitance and background capacitance of the touch panel 10 shown in FIG. 9B, the controller 11 initiates the deduction control for reducing the difference between sensing capacitance and background capacitance of the touch panel 10 by adjusting background capacitance. The difference between sensing capacitance and background capacitance of the touch panel 10 will be reduced. In one embodiment, the difference between sensing capacitance and background capacitance of the touch panel 10 is about zero. Thus, false operation of the touch area 10A of the touch panel 10 can be avoided.

Figure 11:
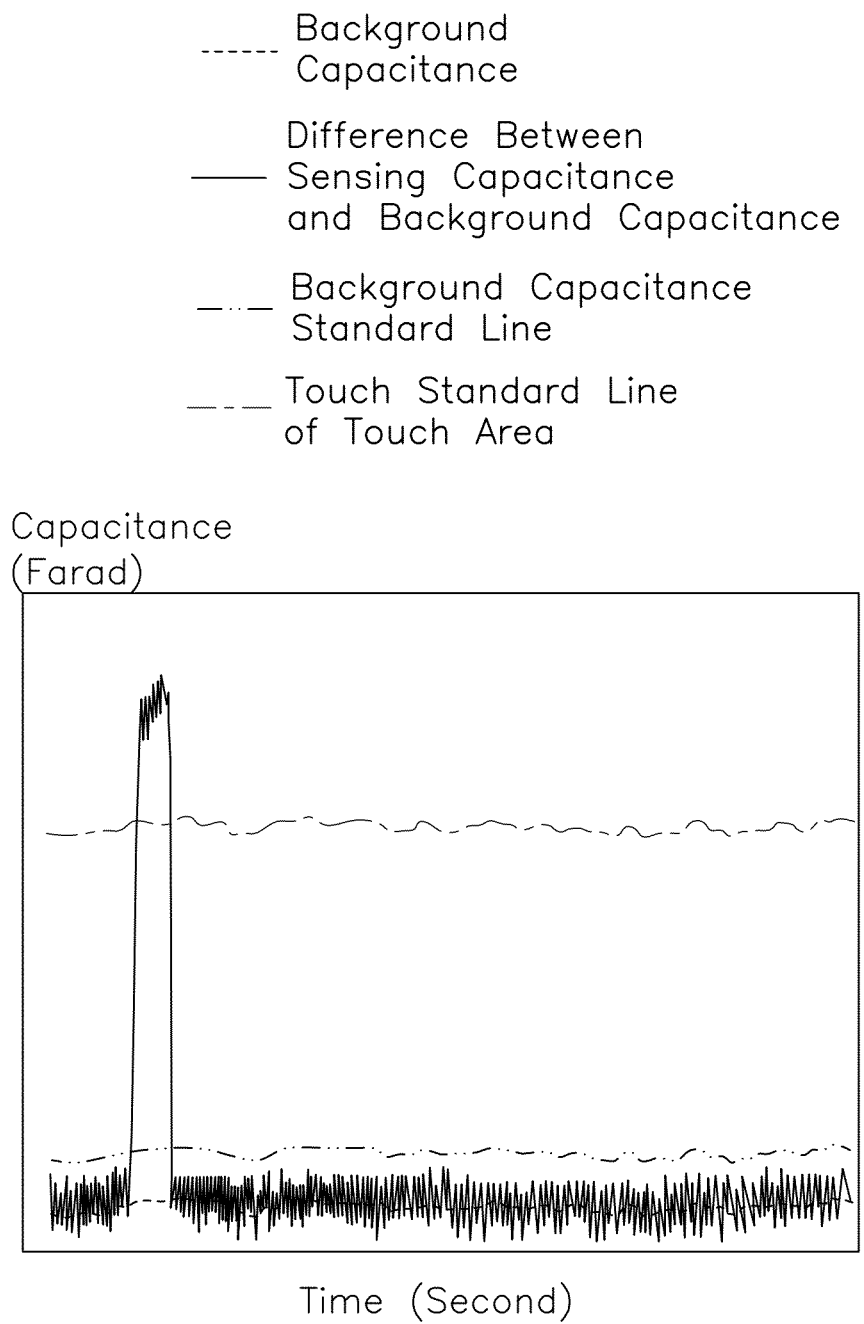
FIG. 11 is a waveform chart of capacitance-time curves of the touch panel shown in FIG. 1.

Referring to FIG. 11, which shows capacitance-time curves of the touch panel 10, a difference between sensing capacitance and background capacitance is greater than a touch standard line of the touch area 10A of the touch panel 10. Thus, the touch area 10A of the touch panel 10 is determined to be touched. In other words, the controller 11 senses the touch in the touch area 10A. Accordingly, the controller 11 will not initiate a deduction control because the touch area 10A is determined to be touched.

Figure 12:
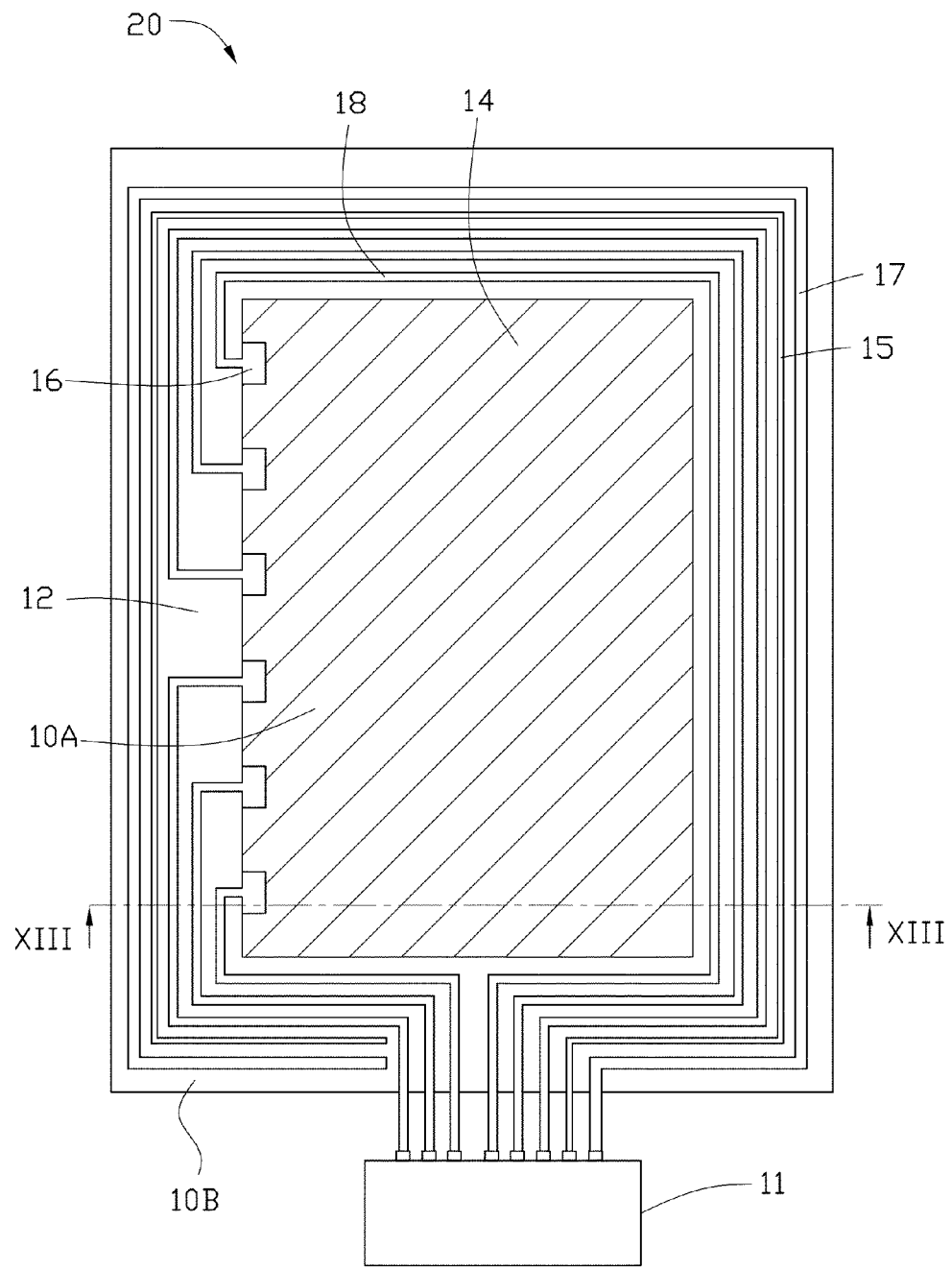
FIG. 12 is a schematic view of one embodiment of a touch panel.
Figure 13:
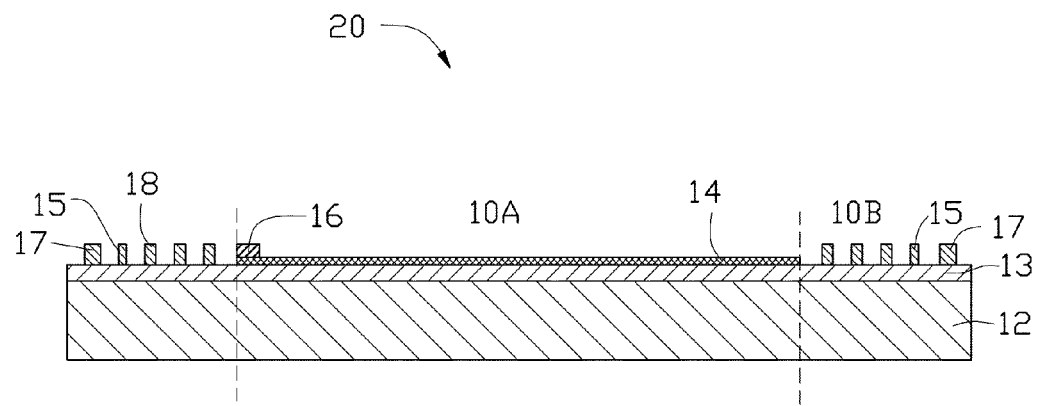
FIG. 13 is a cross-section of the touch panel shown in FIG. 12 taken along a line XIII-XIII thereof.

According to one embodiment, a touch panel 20 having a touch area 10A and a trace area 10B, as illustrated in FIG. 12 and FIG. 13, includes a controller 11, an insulating substrate 12, a viscose layer 13, a transparent conductive layer 14, a number of electrodes 16, a number of conductive wires 18, a first conductive zone 15, and a second conductive zone 17.

The touch area 10A is an area for sensing a touch spot of the touch panel 20. The trace area 10B is an area for disposing the conductive wires 18, the first conductive zone 15, and the second conductive zone 17 rather than sensing the touch spot. In one embodiment, the touch area 10A is a central area of the touch panel 20. The trace area 10B is an area surrounding the touch area 10A. An area of the touch area 10A is less than an area of the touch panel 20.

The viscose layer 13 is disposed on a surface of the insulating substrate 12. The transparent conductive layer 14, the conductive wires 18, the first conductive zone 15, and the second conductive zone 15 are disposed on a surface of the viscose layer 13. The transparent conductive layer 14 corresponds to the touch area 10A of the touch panel 20. The first conductive zone 15, the second conductive zone 17, and the conductive wires 18 are disposed in the trace area 10B of the touch panel 20 at a distance. The electrodes 16 are disposed on a surface and at one side of the transparent conductive layer 14. The number of the electrodes 16 is the same as the number of the conductive wires 18. Each of the electrodes 16 is electrically connected to the transparent conductive layer 14. Each of the conductive wires 18 has two ends. One end of each of the conductive wires 18 is respectively electrically connected to each of the electrodes 16, and the other end of each of the conductive wires 18 is electrically connected to the controller 11. Thus, the transparent conductive layer 14 is electrically connected to the controller 11 via the electrodes 16 and the conductive wires 18. Furthermore, in one embodiment, the transparent conductive layer 14, the conductive wires 18, the first conductive zone 15, and the second conductive zone 17 can be disposed on the surface of the insulating substrate 12.

The number of the electrodes 16 relates to the area or a touch DPI of the touch panel 20. More specifically, when the area or the touch DPI of the touch panel 20 is greater, the number of the electrodes 16 is proportionally greater, and vice versa. In one embodiment, there are six electrodes 16, disposed on one side of the transparent conductive layer 14.

The first conductive zone 15 and the second conductive zone 17 extend along a part of each of the conductive wires 18. Furthermore, the first conductive zone 15 and the second conductive zone 17 are substantially parallel with a part of the conductive wires 18. In one embodiment, the first conductive zone 15 and the second conductive zone 17 extend along each of the conductive wires 18 to pass through the trace area 10B of the touch panel 20. In one embodiment, the conductive wires 18 surround the transparent conductive layer 14. The first conductive zone 15 surrounds the conductive wires 18. The second conductive zone 17 surrounds the first conductive zone 15. A width of the first conductive zone 15 is different from a width of the second conductive zone 17. In this embodiment, the width of the second conductive zone 17 is greater than the width of the first conductive zone 15.

During use of the touch panel 20, the controller 11 initiates a deduction control when the controller 11 senses a touching of the trace area 10B of the touch panel 20 rather than a touching of the touch area 10A of the touch panel 20.

Figure 14:
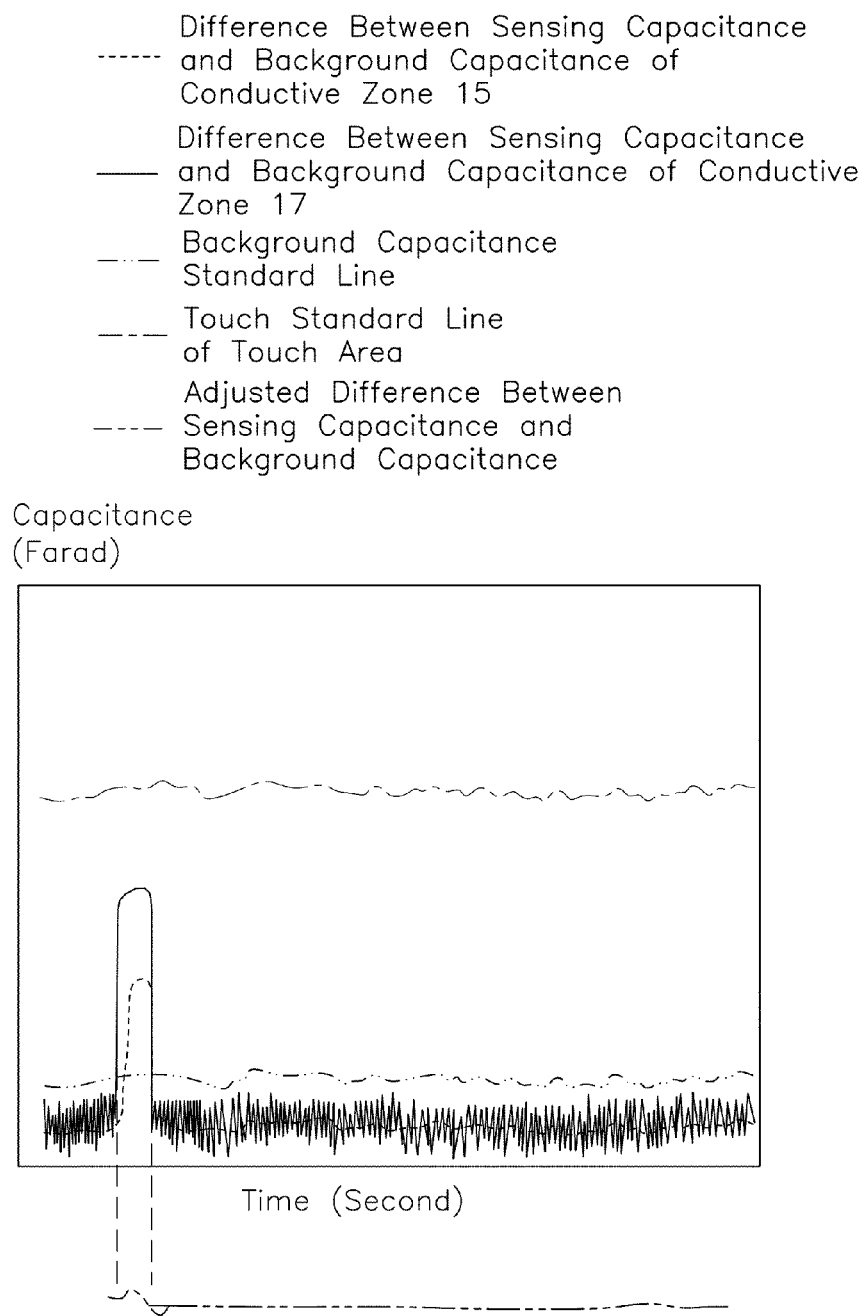
FIG. 14 is a waveform chart of capacitance-time curves of the touch panel shown in FIG. 12.

Referring to FIG. 14, which shows capacitance-time curves of the touch panel 20, a difference between sensing capacitance and background capacitance of the first conductive zone 15 and a difference between sensing capacitance and background capacitance of the second conductive zone 17 are greater than a background capacitance standard line, and smaller than a touch standard line of the touch area 10A of the touch panel 20. Thus, the first conductive zone 15 and the second conductive zone 17 disposed in the trace area 10B of the touch panel 20 are determined to be touched. In other words, the controller 11 senses a touching of the trace area 10B. The difference between sensing capacitance and background capacitance of the second conductive zone 17 is greater than the difference between sensing capacitance and background capacitance of the first conductive zone 15 because the width of the second conductive zone 17 is greater than the width of the first conductive zone 15.

When the controller 11 initiates the deduction control, the difference between sensing capacitance and background capacitance of the touch panel 20 is reduced in response to the difference between sensing capacitance and background capacitance of the first conductive zone 15 and the difference between sensing capacitance and background capacitance of the second conductive zone 17. In one embodiment, the difference between sensing capacitance and background capacitance of the touch panel 20 is about zero. Thus, the false operation of the touch area 10A of the touch panel 20 can be avoided.

The present disclosure is capable of providing a touch panel having at least one conductive zone in a trace area of the touch panel, which can avoid false operations of a touch area of the touch panel and improve the precision of detecting a touch spot.

Finally, it is to be understood that the above-described embodiments are intended to illustrate rather than limit the present disclosure. Variations may be made to the embodiments without departing from the spirit of the disclosure as claimed. Elements associated with any of the above embodiments are envisioned to be associated with any other embodiments. The above-described embodiments illustrate the scope of the disclosure but do not restrict the scope of the disclosure.

What is claimed is:

1. A touch panel having a touch area and a trace area, comprising:
    an insulating substrate;
    a transparent conductive layer disposed on the insulating substrate, wherein the transparent conductive layer corresponds to the touch area;
    a plurality of electrodes electrically connected to the transparent conductive layer;
    a plurality of conductive wires electrically connected to a controller, each of the conductive wires electrically connected to a corresponding electrode; and
    a first conductive zone having a first end and a second end, wherein the first end of the first conductive zone is electrically connected to the controller,
    wherein the first conductive zone and the plurality of conductive wires are disposed in the trace area at a distance to avoid false operation of the touch area.

2. The touch panel as claimed in claim 1, wherein the second end of the first conductive zone is electrically insulated from the controller, the transparent conductive layer, the plurality of electrodes, and the plurality of conductive wires.

3. The touch panel as claimed in claim 1, wherein the first conductive zone extends along a part of the plurality of conductive wires.

4. The touch panel as claimed in claim 3, wherein the first conductive zone is a straight conductive zone substantially parallel with a part of the plurality of conductive wires.

5. The touch panel as claimed in claim 3, wherein the plurality of conductive wires surrounds the transparent conductive layer, and the first conductive zone surrounds the plurality of conductive wires.

6. The touch panel as claimed in claim 1, further comprising a second conductive zone having a first end and a second end, wherein the first end of the second conductive zone is electrically connected to the controller, the second end of the second conductive zone is insulated from the transparent conductive layer, the plurality of electrodes, and the plurality of conductive wires, and the second conductive zone and the plurality of conductive wires are disposed in the trace area at a distance.

7. The touch panel as claimed in claim 6, wherein the first conductive zone and the second conductive zone extend along a part of the plurality of conductive wires.

8. The touch panel as claimed in claim 7, wherein the first conductive zone and the second conductive zone are straight conductive zones substantially parallel with a part of the plurality of conductive wires.

9. The touch panel as claimed in claim 7, wherein the plurality of conductive wires surround the transparent conductive layer, and the first conductive zone and the second conductive zone surround the plurality of conductive wires.

10. The touch panel as claimed in claim 9, wherein a part of the first conductive zone and a part of the second conductive zone are disposed in the trace area at a distance, and substantially parallel with each other.

11. The touch panel as claimed in claim 6, further comprising a third conductive zone having a first end and two second ends, wherein the first end of the third conductive zone is electrically connected to the controller, the second ends of the third conductive zone are oppositely disposed in the trace area and insulated from the transparent conductive layer, the plurality of electrodes, and the plurality of conductive wires, and the third conductive zone and the plurality of conductive wires are disposed in the trace area at a distance.

12. The touch panel as claimed in claim 11, wherein the first conductive zone, the second conductive zone, and the third conductive zone extend along a part of the plurality of conductive wires.

13. The touch panel as claimed in claim 11, wherein the third conductive zone is a T-shaped conductive zone.

14. The touch panel as claimed in claim 1, wherein the transparent conductive layer is a carbon nanotube film comprising a plurality of successive and oriented carbon nanotubes joined end-to-end by van der Waals force therebetween.

15. A touch panel having a touch area and a trace area, comprising:
   an insulating substrate;
   a transparent conductive layer fixed on the insulating substrate, wherein the transparent conductive layer corresponds to the touch area;
   a plurality of electrodes electrically connected to the transparent conductive layer;
   a plurality of conductive wires electrically connected to a controller, each of the conductive wires electrically connected to a corresponding electrode;
   a first conductive zone having a first end and a second end; and
   a second conductive zone having a first end and a second end,
   wherein the first conductive zone, the second conductive zone and the plurality of conductive wires are disposed in the trace area at a distance, the first ends of the first conductive zone and the second conductive zone are electrically connected to the controller, and a width of the first conductive zone is different from a width of the second conductive zone to avoid false operation of the touch area.

16. The touch panel as claimed in claim 15, wherein the second ends of the first conductive zone and the second conductive zone are electrically insulated from the controller, the transparent conductive layer, the plurality of electrodes, and the plurality of conductive wires.

17. The touch panel as claimed in claim 15, wherein the first conductive zone and the second conductive zone extend along a part of the plurality of conductive wires.

18. The touch panel as claimed in claim 17, wherein the plurality of conductive wires surround the transparent conductive layer, and the first conductive zone and the second conductive zone surround the plurality of conductive wires.

19. The touch panel as claimed in claim 18, wherein the first conductive zone and the second conductive zone are substantially parallel with each other.

20. The touch panel as claimed in claim 15, wherein the transparent conductive layer is a carbon nanotube film comprising a plurality of successive and oriented carbon nanotubes joined end-to-end by van der Waals force therebetween.

* * * * *